(12) United States Patent
Marr (10) Patent No.: US 6,681,320 B1
(45) Date of Patent: Jan. 20, 2004

(54) CAUSALITY-BASED MEMORY ORDERING IN A MULTIPROCESSING ENVIRONMENT

(75) Inventor: Deborah T. Marr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,527

(22) Filed: Dec. 29, 1999

(51) Int. Cl.[7] .............................................. G06F 9/312
(52) U.S. Cl. ..................... 712/216; 711/141; 712/32; 712/218; 712/225
(58) Field of Search ................... 711/141; 712/216, 712/225, 32, 218

(56) References Cited

U.S. PATENT DOCUMENTS

| | | | |
|---|---|---|---|
| 5,185,871 A | 2/1993 | Frey et al. ................... 712/205 |
| 5,265,220 A | 11/1993 | Kinoshita ................... 711/205 |
| 5,303,362 A | 4/1994 | Butts, Jr. et al. ............ 711/121 |
| 5,404,483 A | 4/1995 | Stamm et al. ............... 711/144 |
| 5,420,991 A | 5/1995 | Konigsfeld et al. ......... 711/150 |
| 5,613,153 A | 3/1997 | Arimilli et al. ................. 710/1 |
| 5,619,662 A | 4/1997 | Steely, Jr. et al. .......... 712/216 |
| 5,692,151 A | 11/1997 | Cheong et al. .............. 711/140 |
| 5,692,153 A | * 11/1997 | Malik et al. ................. 711/141 |
| 5,706,464 A | 1/1998 | Moore et al. ................. 711/122 |
| 5,751,983 A | * 5/1998 | Abramson et al. .......... 712/216 |
| 5,751,986 A | * 5/1998 | Fetterman et al. .......... 712/218 |
| 5,796,977 A | 8/1998 | Sarangdhar et al. ............ 709/1 |
| 5,806,086 A | 9/1998 | Kimmel et al. .............. 711/145 |
| 5,887,146 A | 3/1999 | Baxter et al. ................ 710/104 |
| 5,930,822 A | 7/1999 | Chaney et al. .............. 711/150 |
| 5,987,549 A | 11/1999 | Hagersten et al. .......... 710/107 |
| 5,987,579 A | 11/1999 | Nishtala et al. ............. 711/169 |
| 5,999,727 A | 12/1999 | Panwar et al. .............. 712/225 |
| 6,049,851 A | 4/2000 | Bryg et al. .................. 711/141 |
| 6,052,760 A | 4/2000 | Bauman et al. ............. 711/119 |
| 6,055,605 A | * 4/2000 | Sharma et al. .............. 711/130 |
| 6,065,086 A | 5/2000 | Arimilli et al. ............. 710/310 |
| 6,085,295 A | 7/2000 | Ekanadham et al. ........ 711/145 |
| 6,088,770 A | 7/2000 | Tarui et al. .................. 711/148 |
| 6,134,632 A | 10/2000 | Looi et al. ................... 711/117 |
| 6,167,492 A | 12/2000 | Keller et al. ................. 711/154 |
| 6,175,930 B1 | 1/2001 | Arimilli et al. ................. 714/3 |
| 6,253,291 B1 | * 6/2001 | Pong et al. .................. 711/146 |
| 6,266,768 B1 | 7/2001 | Frederick, Jr. et al. ..... 712/220 |
| 6,275,913 B1 | 8/2001 | Jeddeloh ..................... 711/158 |
| 6,275,914 B1 | 8/2001 | Jeddeloh ..................... 711/158 |
| 6,360,314 B1 | 3/2002 | Webb, Jr. et al. ........... 712/219 |

FOREIGN PATENT DOCUMENTS

EP    0 911 736 A1    10/1998

OTHER PUBLICATIONS

INTEL Corporation, "Profusion*, An 8–way Symmetric Multiprocessing Chipset", Jul. 1999, pp. 1–15, URL: http://www.intel.com.

Adve, S. et al, "Shared Memory Consistency Models: A Tutorial," *Rice University ECE Tech. Rep. 9512 and Western Research Laboratory Research Report 95/7, Department of Electrical and Computer Engineering, Rice University and Western Research Laboratory, DEC*, Sep. 1995, pp. 1–28 and abstract.

(List continued on next page.)

*Primary Examiner*—Kenneth S. Kim
(74) *Attorney, Agent, or Firm*—Jeffrey S. Draeger (57) ABSTRACT

Causality-based memory ordering in a multiprocessing environment. A disclosed embodiment includes a plurality of processors and arbitration logic coupled to the plurality of processors. The processors and arbitration logic maintain processor consistency yet allow stores generated in a first order by any two or more of the processors to be observed consistent with a different order of stores by at least one of the other processors. Causality monitoring logic coupled to the arbitration logic monitors any causal relationships with respect to observed stores.

70 Claims, 8 Drawing Sheets

OTHER PUBLICATIONS

Adve, Sarita V. et al, "A Unified Formalization of Four Shared–Memory Models," *Computer Science Tech. Rep. #CS–1051, Department of Computer Science, University of Wisconsin*, Sep. 1991, Revised Sep. 1992, pp. 1–24.

Adve, Sarita V. et al, "Weak Ordering—A New Definition," *Proceedings of the Seventeenth Annual International Symposium on Computer Architecture*, pp. 2–14, 1990.

Adve, Sarita Vikram, "Designing Memory Consistency Models for Shared–Memory Multiprocessors," *Tech. Rep., University of Wisconsin at Madison*, Madison, WI, 1993.

Ahamad, Mustaque et al, "Scalable Information Sharing in Large Scale Distributed Systems," *Proceedings of the Seventh SIGOPS Workshop*, Aug. 1996.

Ahamad, Mustaque et al, "Causal Memory: Definitions, Implementation and Programming," *Tech. Rep. #GIT–CC–93/55, College of Computing, Georgia Institute of Technology*, Sep. 17, 1993, Revised Jul. 22, 1994, pp. 1–25.

Ahamad, Mustaque et al, "The Power of Processor Consistency," *Tech. Rep. #GIT–CC–92/34, College of Computing, Georgia Institute of Technology*, Dec. 31, 1992, Revised Jul. 8, 1993, pp. 1–21.

Ahamad, Mustaque et al, "Causal Memory Meets the Consistency and Performance Needs of Distributed Applications!," *Proceedings of the 6$^{th}$ Workshop on ACM SIGOPS European Workshop: Matching Operating Systems to Application Needs*, Sep. 1994, pp. 1–6.

Baldoni, R. et al, "Broadcast with Time and Causality Constraints for Multimedia Applications," *Tech. Rep. No. 2976, Insitut National de Recherche en Informatique et en Automatique Rennes, Appeared in the Proceedings of the 22$^{nd}$ EUROMICRO Conference (IEEE Society Press), Prague, Czech Republic*, pp. 617–626, IRISA, Campus de Beaulieu, France,Sep. 1996.

Baldoni, R. et al, "Efficient Delta–Causal Broadcasting," *International Journal of Computer Systems Science and Engineering*, pp. 263–271, Sep. 1998, (15 pp.).

Cheriton, David R. et al, "Understanding the Limitations of Causally and Totally Ordered Communication," *Computer Science Research Report STAN–CS–93–1485, Stanford University, Sep. 1993, a preprint paper for Proceedings of the 14$^{th}$ Symposium on Operating Systems Principles, ACM*, Dec. 1993, pp. 1–15.

Chrysos, George et al, "Memory Dependence Prediction Using Store Sets," *ACM SIGARCH Computer Architecture News, Proceedings of the 25$^{th}$ Annual International Symposium on Computer Architecture*, vol. 26, Issue 3, pp. 142–153, Apr. 1998.

Friedman, R., "Consistency Conditions for Distributed Shared Memories," *Ph.D. Dissertation, Department of computer Science, The Technion*, 1994.

Heddaya, A. et al, "An Implementation of Mermera: A Shared Memory System that Mixes Coherence with Non–coherence," *Tech. Rep. BU–CS–93–006, Computer Science Department, Boston University*, Jun. 1993.

Ladkin, P. et al, "Lazy Caching in TLA," *Distributed Computing*, vol. 12, pp. 151–174, Feb. 1999.

Lamport, Leslie, "How to Make a Correct Multiprocess Program," *Tech. Rep., Systems Research Center, Digital Equipment Corporation*, Feb. 1993, Revised Jan. 1996 and Sep. 1996.

Lamport, Leslie, "Time, Clocks, and the Ordering of Events in a Distributed System," *Communications of the ACM*, vol. 21, No. 7, pp. 558–565, Jul. 1978.

Moshovos, Andreas et al, "Memory Dependence Speculation Tradeoffs in Centralized, Continuous–Window Superscalar Processors," *Proceedings of HPCA–6*, Feb. 2000.

Moshovos, Andreas et al, "Read–After–Read Memory Dependence Prediction," *Proceedings of the 32$^{nd}$ Annual ACM/IEEE International Symposium on Microarchitecture, Haifa, Israel*, pp. 177–185, Nov. 1999.

Moshovos, Andreas et al, "Speculative Memory Cloaking and Bypassing," *International Journal of Parallel Programming*, Oct. 1999.

Moshovos, Andreas et al, "Streamlining Inter–Operation Memory Communications Via Data Dependence Prediction," *Proceedings of the Thirtieth Annual IEEE/ACM International Symposium on MicroArchicture*, pp. 235–245, Dec. 1997.

Moshovos, Andreas, "Memory Dependence Prediction," *Ph.D. Dissertation, University of Wisconsin—Madison*, 1998.

Prakash, Ravi et al, "An Adaptive Causal Ordering Algorithm Suited to Mobile Computing Environments," *Journal of Parallel and Distributed Computing*, vol. 41, No. 2, pp. 190–204, Mar. 15, 1997.

Prakash, Ravi et al, "An Efficient Causal Ordering Algorithm for Mobile Computing Environments," *Technical Report No. 2680, Institute National de Recherche en Informatique et en Automatique Rennes, Oct., 1995, Appeared in the Proceedings of the 16$^{th}$ International Conference on Distributed Computing Systems (ICDCS), Hong Kong*, pp. 744–751,Sep. 1996.

Ranjit, John, "Implementing and Programming Weakly Consistent Memories," *Ph.D. Thesis, Georgia Institute of Technology*, Mar. 1995.

Sinha, Himanshu Shekhar, "Mermera: Non–Coherent Distributed Shared memory for Parallel Computing," *Technical Report BU–CS–93–005, Boston University*, Apr. 1993.

Vaughan, Francis et al, "Causality Considerations in Distributed, Persistent Operating Systems," *Technical Report GH–05, Dept. of Computer Science, University of Sydney, N.S.W. 2006, Australia*, 1994.

* cited by examiner

| A | B | C | D |
|---|---|---|---|
| ST a+1 | LD a=1 | LD a=0 | LD a=1 |
| ST b+1 | LD b=0 | LD b=0 | LD b=1 |

FIG. 4A

| A | B | C | D | E |
|---|---|---|---|---|
| ST a←1 | ST a←2 | LD a=0 | LD a=1 | LD a=0 |
|  |  | LD a=1 | LD a=2 | LD a=2 |

FIG. 4B

| A | B | C | D | E |
|---|---|---|---|---|
| ST a←1 | ST a←2 | LD a=0 | LD a=2 | LD a=0 |
|  |  | LD a=1 | LD a=1 | LD a=2 |

FIG. 4C

| A | B | C | D | E |
|---|---|---|---|---|
| ST a←1 | ST b←1 | LD a=0 | LD a=1 | LD a=1 |
|  |  | LD b=0 | LD b=0 | LD b=1 |

FIG. 4D

| A | B | C | D | E |
|---|---|---|---|---|
| ST a←1 | ST b←1 | LD b=0 | LD b=1 | LD b=1 |
|  |  | LD a=0 | LD a=0 | LD a=1 |

FIG. 4E

| A | B |
|---|---|
| ST a←1 | ST b←1 |
| LD a=1 | LD b=1 |
| LD b=0 | LD a=0 |

FIG. 4F

| A | B | C | D |
|---|---|---|---|
| ST a←1 | LD a=1 | LD a=1 | LD a=1 |
|  | ST b←1 | LD b=0 | LD b=1 |

FIG. 4G

| A | B | C | D |
|---|---|---|---|
| ST a←1 | LD a=1 | ST b←1 | LD b=1 |
|  | LD b=0 |  | LD a=0 |

CAUSALITY-BASED MEMORY ORDERING IN A MULTIPROCESSING ENVIRONMENT

BACKGROUND

1. Field

The present disclosure pertains to the field of processing systems. More particularly, the present disclosure pertains to a memory ordering technique for a multiprocessing system.

2. Description of Related Art

Improving the performance of computer or other processing systems generally improves overall throughput and/or provides a better user experience. One technique of improving the overall quantity of instructions processed in a system is to increase the number of processors in the system. Implementing multiprocessing (MP) systems, however, typically requires more than merely interconnecting processors in parallel. For example, tasks or programs may need to be divided so they can execute across parallel processing resources.

Another major challenge in an MP system is maintaining memory consistency (also known as coherency). Memory consistency is the general requirement that memory remain sufficiently updated to supply a current copy of memory contents to a requesting processor or other device. Maintaining memory consistency is complicated by the use of internal caches and other data structures that store data for more efficient access than is typically available from other (e.g., external) memory circuits.

A system may maintain memory consistency using hardware or using a combination of hardware and software techniques. The hardware provides a particular memory ordering guarantee, a guarantee that the hardware will maintain the sequential nature of program memory accesses (to at least some selected degree) at some selected point in the system hierarchy. Software may be used in some systems to supplement hardware-provided memory ordering by forcing additional ordering restrictions at desired times. The memory ordering scheme implemented is a design choice involving a tradeoff between hardware complexity, software complexity, and the desired ability to cache and buffer data.

One prior art technique that represents a compromise between weakly ordered memory consistency models and very restrictive consistency models is "processor consistency". The processor consistency model is a known prior art model which allows limited reordering. One implementation is used in some prior current processors (see, e.g., U.S. Pat. No. 5,420,991). Memory ordering constraints for one embodiment of a prior art processor consistency memory model system are shown in FIG. 1a.

Figure 1A:
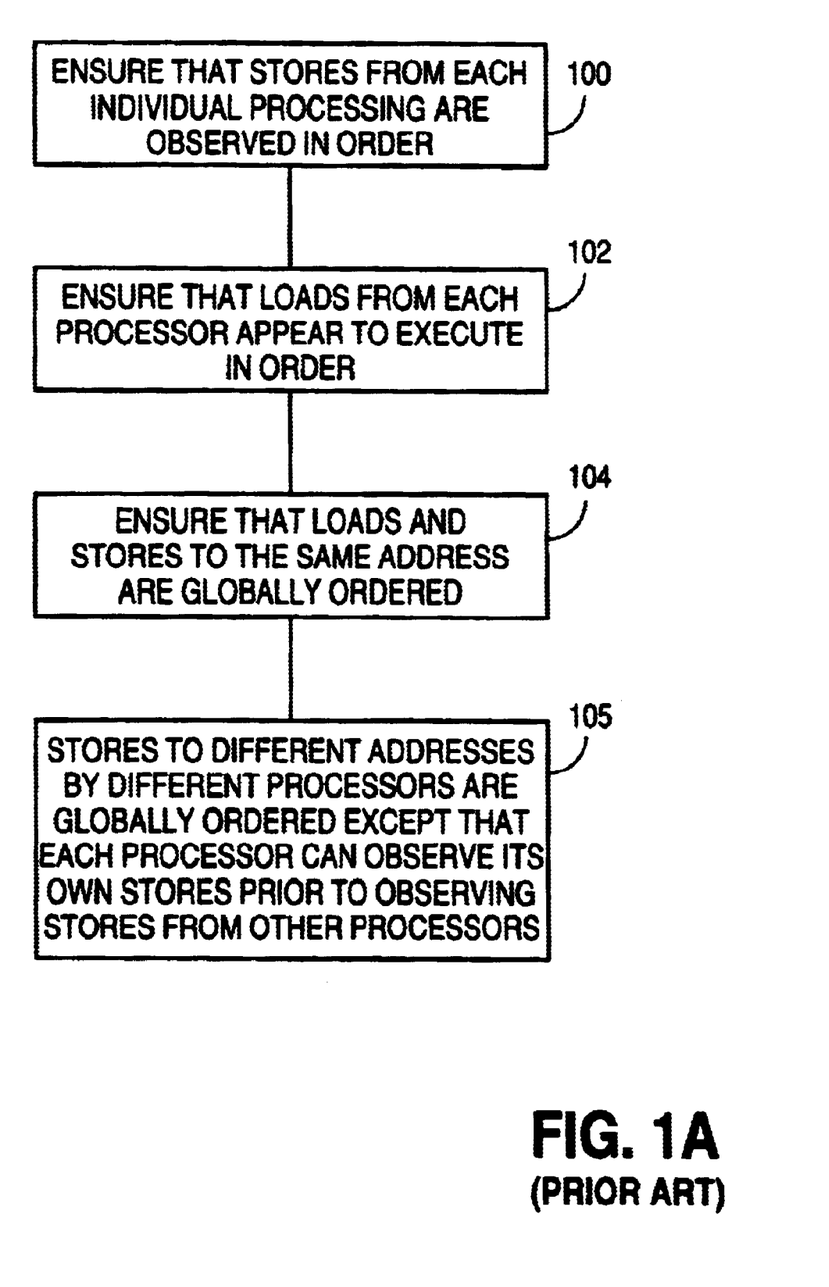
FIG. 1a illustrates a prior art memory ordering technique.

According to block 100 of FIG. 1a, the prior art system ensures that stores from each individual processor in the system are observed in order by all other processors. In other words, individual stores from a particular processor are not re-ordered with respect to each other. As indicated in block 102, the system ensures that loads from each processor appear to execute in order. In some systems, optimizations may be done; however, load data appears to be returned to the computation-performing unit in order to avoid altering the ordering relationships between the system loads and stores. On the other hand, if the load data being returned has not been altered by non-globally-observed stores, the order of that the load data is returned may be varied, and the data still appears to be returned in order.

Additionally, as indicated in block 104, the system ensures that loads and stores to the same address are globally ordered. Thus, all agents in the system observe loads and stores to the same address in the same order. The consequences of the constraints of blocks 100–104 are discussed in greater detail (see FIGS. 4a–b) as some embodiments of the present invention include these constraints as well.

Finally, as indicated in block 105, stores to different addresses by different processors are globally ordered except that each processor can observe its own stores prior to observing stores from other processors. This prior art constraint is further contrasted with the present invention below (see FIGS. 4c–4e for implications of this prior art constraint). Some systems (e.g., systems based on the Profusion Chipset from Intel Corporation of Santa Clara) may require substantial hardware to ensure reasonably efficient ordered global observation of different stores to different memory locations by different processors.

Moreover, memory ordering overhead continues to grow dramatically as systems which implement traditional memory ordering models are scaled up to meet additional processing challenges. Consequently, there is a continuing need for memory ordering techniques that allow improved efficiency while maintaining a predetermined memory ordering protocol such as processor consistency.

BRIEF DESCRIPTION OF THE FIGURES

The present invention is illustrated by way of example and not limitation in the Figures of the accompanying drawings.

FIG. 2b illustrates one embodiment of a technique for store forwarding which may be utilized by the system in FIG. 2a.

DETAILED DESCRIPTION

The following description provides causality-based memory ordering in a multiprocessing environment. In the following description, numerous specific details such as system arrangements and hierarchies, types of bus agents, and logic partitioning/integration choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement the necessary logic circuits without undue experimentation.

The disclosed memory ordering techniques may advantageously improve overall processing throughput in some systems. Improved throughput may be achieved by relaxing traditional memory ordering rules in a manner that allows the system to more efficiently order load and/or store accesses. Efficiency may be improved by either actively reordering memory accesses or by allowing memory accesses to occur in a new order permitted by the relaxed ordering rules. Such memory ordering rules may be implemented so that processor consistency is maintained, thereby allowing backwards compatibility with software that assumes traditional processor consistency is provided. "Processors" may be bus agents or devices of any type which process data and/or instructions and therefore need to access memory.

Figure 1B:
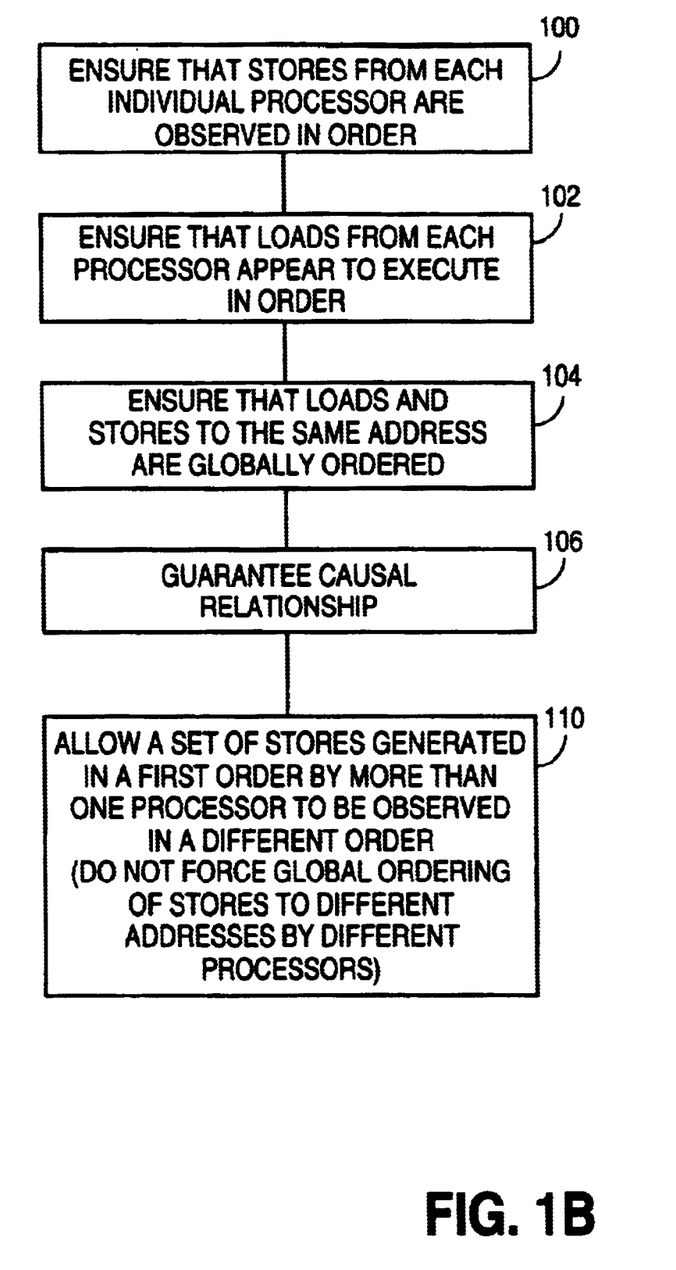
FIG. 1b illustrates one embodiment of an alternative memory ordering technique.

FIG. 1b illustrates one embodiment of a disclosed memory ordering technique. Various details and embodiments are included in the remaining Figures and accompanying description further explain the memory ordering techniques referred to in FIG. 1b. Blocks 100–104 of FIG. 1b also appear in and are discussed with respect to FIG. 1a.

The presently disclosed techniques deviate from the restrictive ordering constraints detailed in block 105 of FIG. 1a. As indicated in block 106 of FIG. 1b, causal relationships are maintained. Maintaining causal relationships entails maintaining sufficiently sequential access to obtain correct results in cases where one access affects or may affect another. In other words, if a value stored by a first store from a first processor is loaded by a second processor, the ordering of these two memory accesses with respect to subsequent stores from the second processor is important. Subsequent stores by the loading processor should be ordered after the load and the first store since the first store may affect the value stored by the second store.

A true causal connection between two stores executed by different processors occurs when the second store from the second processor directly depends on the value generated by the first store from the first processor. Due to speculative execution and aggressive prefetching techniques, among other things, it may be difficult to precisely determine when the two stores are truly causally linked. Accordingly, for simplicity, causality may be assumed when the second processor merely loads the value stored by the first processor in the first store.

Thus, observation of a particular memory location occurs when an agent loads all or a portion of the contents of that memory location. "Global observation" of a newly stored value is achieved when data has propagated sufficiently through the system that potential observers will observe the new value if they load the affected memory location. In other words, all agents would see the new value if they performed a load operation after global observation of the store. Local observation occurs when a subset of the potential observers would see the new value if they performed a load.

Block 110 further indicates a relaxation of traditional memory ordering rules according to the presently disclosed techniques. Block 110 states that the system reorders a set of stores generated in a first order by more than one processor to be observed in a different order. In other words, under certain circumstances, stores from a first processor may be re-ordered with respect to stores from another processor. Stating this in the negative, the system does not force global ordering of stores to different addresses by different processors. In some embodiments, different processors may observe such sets of stores in different orders. Notably, the "first order" that the set of stores are in may include simultaneous stores as multiple processors in some multi-processing systems may generate stores at the same time.

The re-ordering allowed in block 110, however, is subject to several conditions according to one embodiment. In this embodiment, the re-ordering performed in block 110 is subject to the constraints of block 100, 102, 104, and 106. Namely, inter-processor store ordering may be altered as long as stores from each individual processor remain in order, loads from each processor appear to execute in order, loads and stores to the same address are globally ordered, and causality is maintained. Other embodiments may employ only a subset of these restrictions in implementing a multiprocessing system with causality based memory ordering.

Figure 2A:
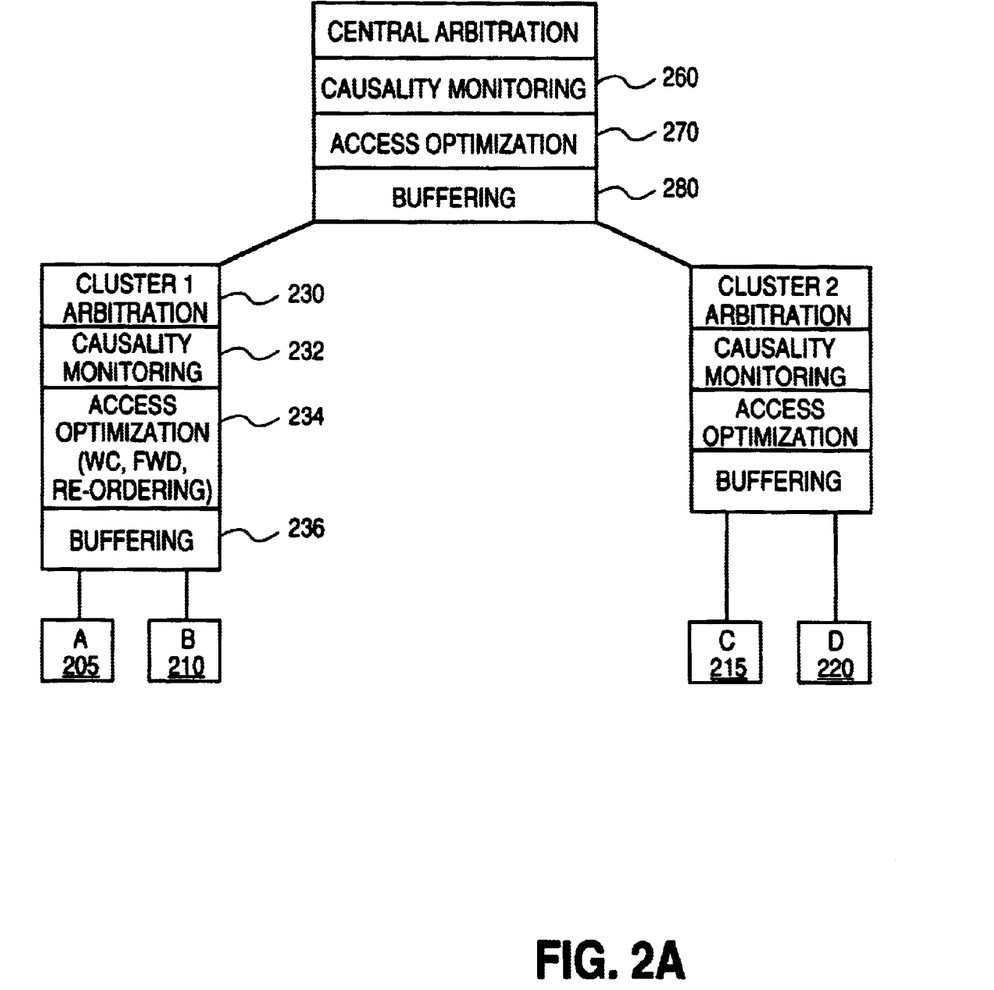
FIG. 2a illustrates one embodiment of a system capable of operating according to disclosed memory ordering techniques.

FIG. 2a illustrates one embodiment of a system that implements disclosed causality-based memory ordering techniques. The system of FIG. 2a has a first plurality of processors including processor A 205 and processor B 210 coupled to cluster 1 arbitration logic 230, causality monitoring logic 232, access optimization logic 234 and buffering logic 236. Similarly, the system includes processor C 215 and processor D 220 coupled to cluster 2 arbitration logic 240, causality monitoring logic 242, access optimization logic 244, and buffering logic 246.

The cluster arbitration logic 230 and 240 is coupled to central arbitration logic 250, causality monitoring logic 260, access optimization logic 270, and buffering logic 280. Each of these sets of arbitration logic, causality monitoring logic, access optimization logic, and buffer logic may function similarly. In one embodiment, the various logic elements cooperate to implement the memory ordering protocol indicated in FIG. 1b. Specifically, the access optimization logic blocks may improve the efficiency of the completion order for loads and/or stores buffered by the buffering logic unless the causality monitoring logic indicates that such reordering is problematic. The central arbitration logic 250 may coordinate these activities, perform its own optimizations, and ultimately dispatch memory accesses to a memory (not shown) or other arbitration logic (not shown).

The details of these logic various blocks will be discussed with respect to cluster 1; however, a similar implementation may be used for the other similarly labeled blocks. With respect to cluster 1, the buffering logic 236 buffers loads and stores from each agent. The arbitration logic 230 arbitrates and schedules the accesses from all agents in cluster 1 in an efficient manner with the assistance of the access optimization logic 234. The arbitration logic 230 also arbitrates for resources at the next level in the system hierarchy (e.g., from the central arbitration logic 250).

The access optimization logic 234 performs operations such as access reordering, write combining (WC), and data forwarding (FWD) to improve the overall efficiency of the accesses generated by arbitration logic. Such optimizations, however, may be limited by the constraints discussed with respect to FIG. 1b. Accordingly, the access optimization logic cooperates with the causality monitoring logic 234 to determine the degree of optimization that is permissible. For example, in accordance with block 100 in FIG. 1b, stores from each agent are scheduled in order with respect to other stores from that agent.

One optimization that may be performed by the access optimization logic 234 is store forwarding. One embodiment performs store forwarding as detailed in the flow chart of FIG. 2b. In general, store forwarding (also known as data forwarding) involves checking received loads against pending (buffered) stores to detect forwarding conditions that allow data buffered with the stores to be forwarded to loads. One forwarding condition arises when a load requests data from a memory location for which there is a previous store from the same agent to the same memory location buffered in the buffering logic 236. As indicated in blocks 281 and 282 of FIG. 2b, in this case, the load may be satisfied by forwarding the buffered data to the requesting agent.

Figure 2B:
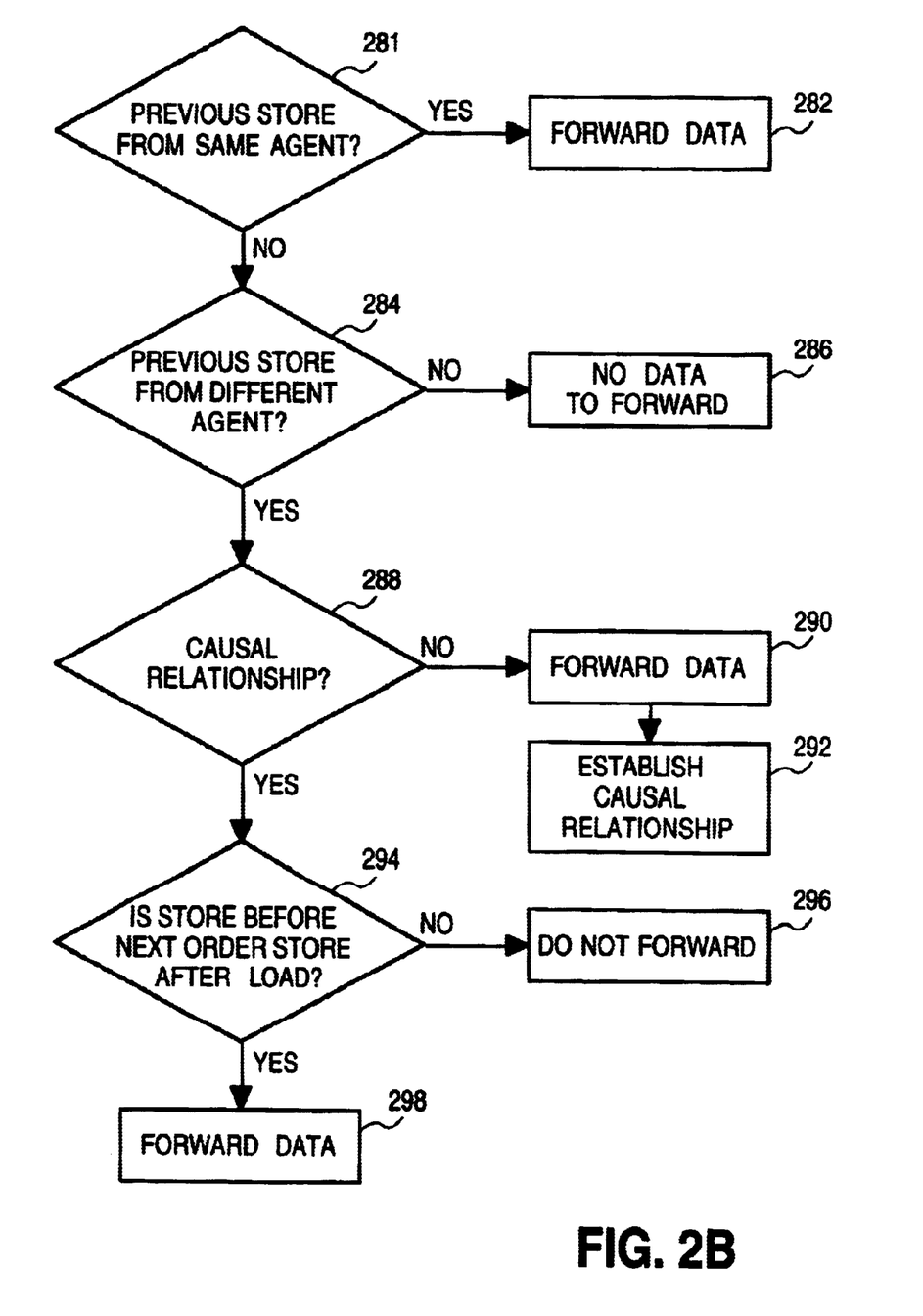

As detected block 284, if a load requests data from a memory location for which there is a store from a different agent to the same memory location and (as detected in block 288) there is no causal relationship between the stores of the two agents, then the store data can be forwarded to the load as indicated in block 290. In this case, a causal relationship is established between the two agents as indicated in block 292. Consequently, the stores prior to the store that provided the forwarded data are to precede the subsequent stores from the agent that received the new data in this embodiment.

If a causal relationship is detected in block 288, then the order of the load and store is checked as indicated in block 294. This occurs when a load requests data from a memory location for which there is a store from a different agent (to the same memory location), and there is a causal relationship between the stores of the two agents. As indicated in block 298, the store data can be forwarded to the load only if the store is ordered previous to the next older store after the load. Otherwise data is not forwarded as indicated in block 296. Thus, store forwarding may be performed more aggressively than in traditional systems, and more efficient overall memory access may advantageously result.

Additionally, general load and store reordering may be done more aggressively than in traditional processor consistency multiprocessing systems because the constraints imposed by the causality-based memory ordering system of FIG. 1b are less onerous than that typically used. Thus, more critical memory accesses may be ordered earlier in some cases, and/or overall ordering may be improved. For example, write cycles may be combined or re-arranged to optimize for a particular burst order, interleaving scheme, or other order-related constraint particular to the system involved.

The cluster arbitration logic 230 and 240, the central arbitration logic 250, as well as the causality monitoring logic, the access optimization logic, and the buffering logic for each, may reside in a single integrated circuit, component, module, or the like, as indicated by their inclusion in an arbitration block 200. Alternatively, these logic blocks may be distributed into various components. One advantageous embodiment is an integrated (e.g., single integrated circuit) multiprocessing system that includes multiple processors (e.g., A, B, etc.) and cluster arbitration logic for that set of processors. Additionally, while the separation of these logical units in two different blocks may aid in an understanding of the presently disclosed techniques, such a clean separation of the various logic functions implemented by these and other blocks discussed herein is not required and indeed may not exist in many implementations.

Figure 3A:
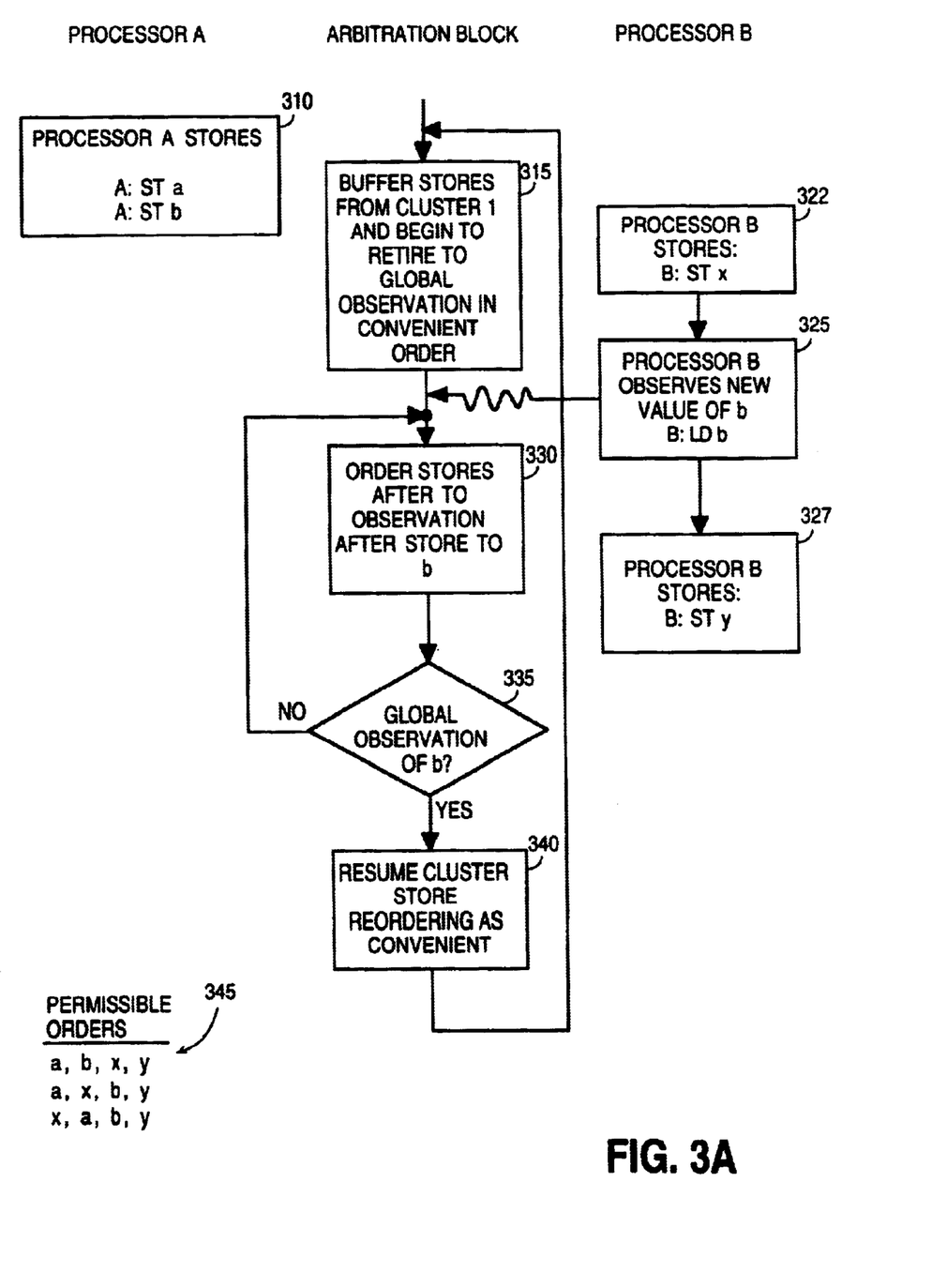
FIG. 3a is a flow diagram illustrating operations for processor A, processor B, and the arbitration logic according to one embodiment when a causal relationship exists between stores.

FIG. 3a illustrates operations performed by one embodiment of the system of FIG. 2a in one case where a causal relationship exists between stores. As indicated in block 310, Processor A stores values to memory locations a and b. According to block 100 (FIG. 1), all stores from processor A are kept in order with respect to each other. Loads, on the other hand, may be re-ordered with respect to some stores in a known or otherwise available manner.

Additionally, according to presently disclosed techniques, store optimizations may be performed at the level of the arbitration block 200. As indicated in block 322, processor B stores a value in memory location x. Since the operation in block 322 by processor B is not causally linked to the stores to locations a and b generated by processor A, the arbitration block 200 can reorder stores generated by processor A and processor B into a convenient order as indicated in block 315. For example, some or all of the writes may be combined or pipelined and/or the writes may be ordered in a sequential order.

As indicated in block 325, processor B may prevent or interrupt such reordering. In block 325, processor B observes (e.g., by loading) memory location b. This observation is recognized by the arbitration block 200, which may continuously check for accesses to addresses of buffered stores. As indicated in block 330, the observation of memory location b by processor B causes the arbitration block 200 to order stores generated after the observation of processor A's store to b so that such stores are actually completed after the store to location b. Thus, the arbitration block 200 can not reorder the stores to memory location y generated by processor B in block 327 before the store by processor A to location b. This tightened store ordering is enforced, as indicated in block 335, until global observation of b is achieved. Thereafter, store reordering may be resumed as indicated in block 340.

Thus, in the example of FIG. 3a, the disclosed memory ordering technique may allow improved efficiency for the case where there is no causal connection between stores generated by different processors. In other words, since the store to memory location a by processor A has no causal relation to store to memory location x by processor B, the stores may be reordered in a manner that is more efficient. On the other hand, since the store to location y by processor B is causally related to the store by processor A to location b, the stores may not be reordered completely. The legal or permissible orders without violating causality are indicated by reference number 345.

| Permissible Orderings for Embodiment of FIG. 3a |
|---|
| a, b, x, y |
| a, x, b, y |
| x, a, b, y |

Additional efficiencies may be expected by performing reordering across more than two processors as a larger number of processors are likely to have more causally unrelated stores.

Figure 3B:
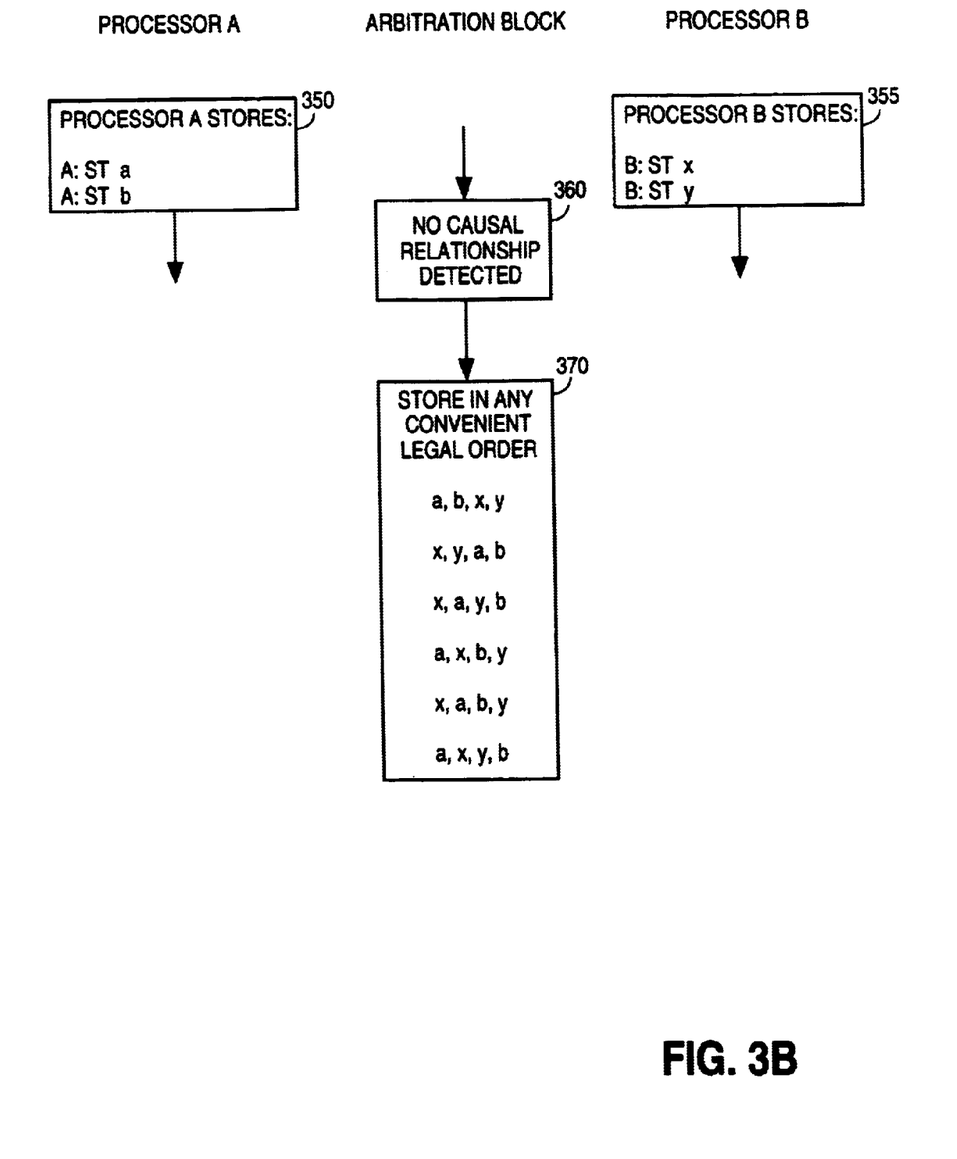
FIG. 3b is a flow diagram illustrating operations for processor A, processor B, and the arbitration logic according to one embodiment when no causal relationship exists between stores.

FIG. 3b illustrates operations performed by one embodiment of the system of FIG. 2a in one case where no causal relationship exists between stores. As indicated in block 350, processor A performs stores to locations a and b. Similarly, processor B performs stores to locations x and y as indicated in block 355. Since neither processor loaded another value modified by the other processor, there is no causal relationship between the various stores. Thus, as indicated in block 360, no causal relationship is detected by the arbitration block 200. Accordingly, any convenient order may be used to perform the stores, so long as other system constraints are observed.

| Permissible Orderings for Embodiment of FIG. 3b |
| --- |
| a, b, x, y |
| x, y, a, b |
| x, a, y, b |
| a, x, b, y |
| x, a, b, y |
| a, x, y, b |

FIGS. 4a–4h illustrate various consequences of using the disclosed memory ordering techniques in a multiprocessing system. In one embodiment, the constraints shown in FIG. 1b are enforced.

1. Stores from each processor are observed in order (Block 100).

Again, a store is "observed" when a processor or agent (either the same agent or a different agent) loads a memory location and retrieves the new value of the memory location as modified by the store. When stores from each processor are observed in order, no agent can observe the new value of a sequentially later store from that processor and the old value of a sequentially previous store from that processor.

Figure 4A:
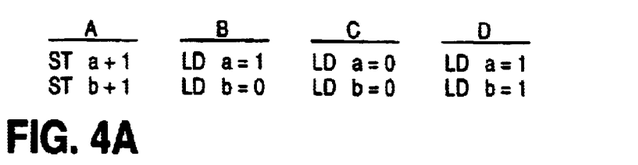
FIGS. 4a, 4b, 4c, 4d, 4e, 4f, 4g and 4h illustrate exemplary memory access sequence occurring in one embodiment of a system using disclosed memory ordering techniques.

FIG. 4a depicts agent A performing two stores. The initial condition is that all memory locations store 0 (in all of FIGS. 4a–4h). First, the value 1 is stored in memory location a by agent A. Thereafter, agent A also stores the value 1 to memory location b. Agents B, C, and D observe the two stores in all the legal scenarios (i.e., permissible orderings according to the implemented memory ordering scheme). Agent B observes the new value of a, but the old value of b, which is acceptable because the store to a occurred before the store to b. Agent C observes the old values of both a and b. Agent D observes the new values of both a and b. No agent can observe the new value of b and the old value of a because that would violate the constraint of block 100.

2. Loads from each processor appear to execute in order (Block 102).

In this embodiment, loads are limited to appearing to execute in order. By appearing to execute in order, it is meant that the load data is returned to the requesting computational unit in order (although data transfer signals may be reordered due to bus protocols, transfer techniques, etc.) if non-globally observed stores might affect the load data. If the load data being returned has not been altered by non-globally-observed stores, then the order of its return may be reordered, and the data still appears to be returned in order since the reordering does not affect the computational unit. If load reordering was allowed for memory locations altered by non-globally-observed stores, then the relative ordering of loads and stores could be affected, and the stores may be observed to execute out of order. In FIG. 4a, agents B, C, and D all execute their loads in order and the proper values are returned to the agents. As an example, if one of the agents were allowed to retire loads out of order, b might be observed as changing before a.

3. Loads and stores to the same address are globally ordered (Block 104).

Figure 4B:
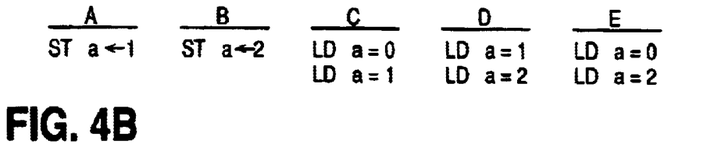

Loads and stores to the same address are globally ordered such that if two agents both store values to the same address, all observing agents observe one of the stores happening before the other. In FIG. 4B, agents A and B both store to location a, with agent A storing 1 and agent B storing 2. Agents C, D, and E observe the two stores in all of the possible orders. Agent D observes agent A's store which changed the value of a to 1, and then observes agent B's store which changed the value of a from 1 to 2. Therefore, no other agent could observe the opposite order in this embodiment. Accordingly, agent C can observe a being 0 and then a being 1, and agent E can observe a being 0 and then a being 2. No agent can first observe a being 2 and then a being 1 according to this embodiment.

Figure 4C:
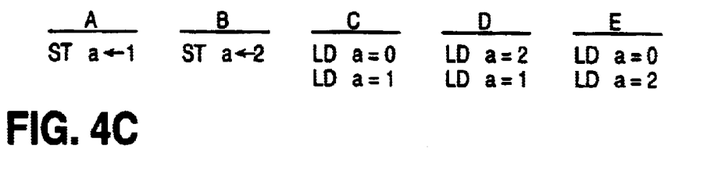

On the other hand, in FIG. 4C, agent D observes Agent B's store which changed the value of location a from 0 to 2, and then observes Agent A's store to the same location, changing the value from location a from 2 to 1. If another agent saw the opposite order, the constraint in block 104 would be violated. Accordingly, agent C first observes a being 0 and then observes a being 1 (no observation when a is 2). Agent E observes a being 0 and then a being 2.

Figure 4D:
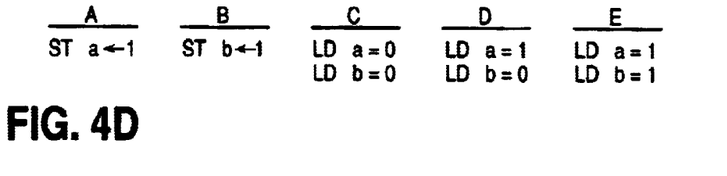
Figure 4E:
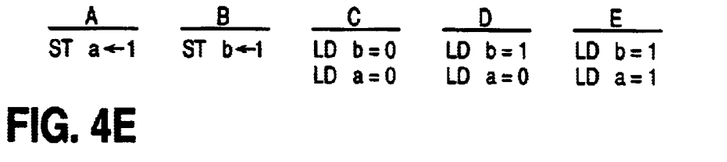

In prior art "processor consistency" systems (e.g., FIG. 1a), stores to different addresses by different processors are generally globally ordered (block 105). In such prior art systems, stores to different addresses are globally ordered except for the case that each agent can observe its own store prior to observing stores from other processors. In FIG. 4D, agents A and B store the value 1 in memory locations a and b respectively. Agent D observes a being 1 before b being 1. Therefore, no other agent observes b being 1 before a being 1 in this embodiment. Agent C observes both a and b being 0, and Agent E observes both a and b being 1.

In FIG. 4E, agents A and B again each store the value 1 in memory locations a and b respectively. Agent D observes b being a 1 before a being a 1. Consequently, no other agent observes a being a 1 before b being a 1 in this embodiment. Agent C observes both b and a being 0, and agent E observes b and a being 1.

Figure 4F:
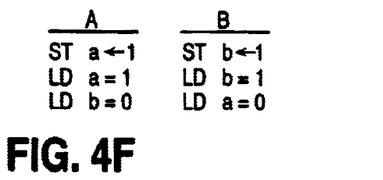

The exception is shown in FIG. 4F, where agents are observing their own stores. In this case, the constraint is not imposed that stores to different addresses need to be globally ordered. Thus, as illustrated in FIG. 4F, agent A observes its own store to location a before agent B's store to location b. Similarly, agent B observes its own store to location b before agent A's store to location a. Thus, except for the self-observation exception, this prior art policy is quite restrictive with respect to different stores from different processors.

4. Causal relationships are guaranteed (Block 106).

Figure 4G:
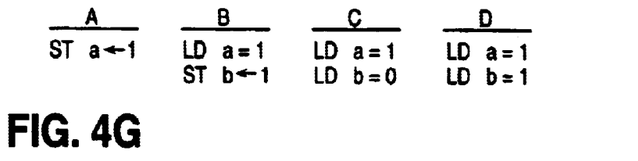

In contrast to prior art systems which forced global ordering of stores to different addresses by different processors, some embodiments employing presently disclosed techniques only enforce a minimal amount of store ordering as required to maintain causality. FIG. 4G illustrates a case where a causal connection is created by observation of a stored value. Agent A stores the value 1 to memory location a, and agent B observes the store to a and then performs a store of the value 1 to memory location b. Agent B introduces a causal relationship between the stores to memory locations a and b, so all agents are constrained to observe the store to a before the store to b. Agent C does just this, observing the store to memory location a first. Agent D is shown as having observed both stores, but did not observe the store to b before the store to a.

If processor B had not observed the store to memory location a, the system could have re-ordered the global observation of these stores to memory locations a and b. In other words, if processor B had not inquired as to the value of location a, processor C (and the rest of the system) may have been indifferent as to whether a or b became 1 first. Since the store to a was observed by processor B, creating a causal connection, the arbitration logic preserved the a-first, b-second ordering.

5. Stores to different addresses by different processors are not globally ordered (Block 110).

Figure 4H:
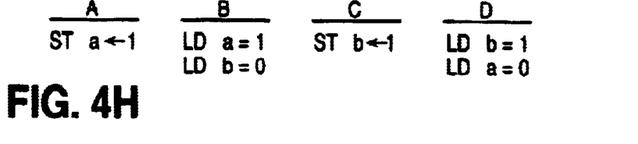

FIG. 4H illustrates a situation where Agents A and C store to two different addresses. Agent A stores the value 1 in memory location a, and agent C stores the value 1 in memory location b. Then Agents B and D observe the two stores in two different orders. This ordering is allowed provided that there is no causal relationship between agents A and C (i.e., there is no observation of a store from the other agent prior to global observation of that store). Accordingly, the other agents (the non-store-issuing agents, agents B and D in this example) can observe stores in a different order. This ordering is not allowed in traditional processor ordering schemes.

Figure 5:
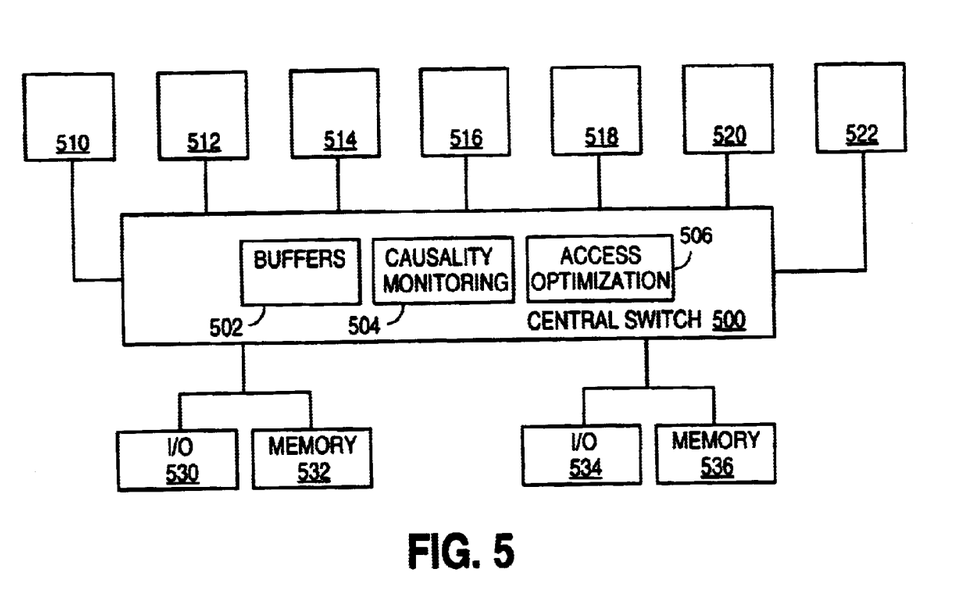
FIG. 5 illustrates one embodiment utilizing a switch-based multiprocessing architecture.

FIG. 5 illustrates one embodiment of a system utilizing a switch-based multiprocessing architecture. In this system, a central switch 500 couples a plurality of processors 510, 512, 514, 516, 518, 520, 522 to a plurality of memory and I/O devices including I/O interfaces 530 and 534 and memory systems 532 and 536. The I/O interfaces 530 and 534 may each provide an interface to one or more I/O devices. The basics of such switch-based multiprocessing arrangements are known in the art.

As distinguished from prior switch-based multiprocessing systems, the embodiment shown in FIG. 5 implements a processor consistent memory architecture with an embodiment of the causality-based memory ordering technique illustrated in FIG. 1b. Accordingly, the central switch 500 ensures that stores from each individual processor are observed in order by all other processors (block 100). The central switch 500 also allows a set of stores generated in a first order by more than one processor to be observed in a different order provided that causality is not violated. To this end, a plurality of buffers 502 are included in the central switch 500 to buffer stores from the various processors before they are committed to a memory (not shown). Access optimization logic 506 can reorder the stores from the plurality of buffers 502, perform store forwarding, and/or make other optimizations as long as no other system limitations are implicated and causality monitoring logic 504 does not detect a causal relation and accordingly limit the optimization that may be done by the access optimization logic 506.

Figure 6:
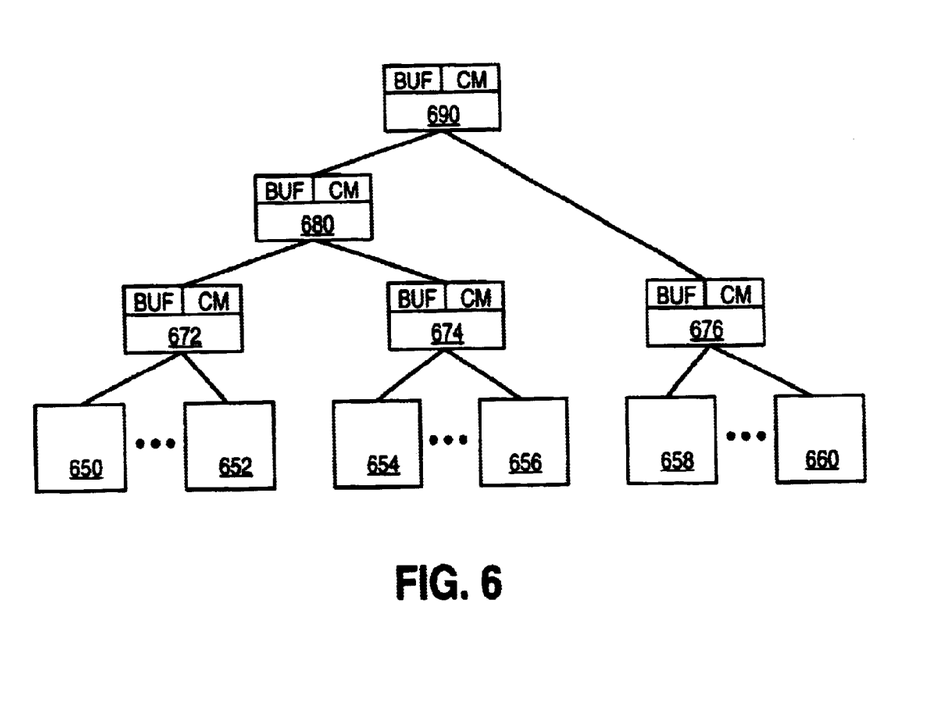
FIG. 6 illustrates one embodiment utilizing a hierarchical cluster-based architecture.

FIG. 6 illustrates a hierarchical, cluster-based multiprocessing system which also implements disclosed techniques for memory ordering. The system of FIG. 6 includes a plurality of processors, processors 650, 652, 654, 656, 658, and 660. Processors 650 and 652, as well as any number of additional processors, form a cluster controlled by a controller 672. Similarly, processors 654 and 656 form a cluster controlled by a controller 674, and processors 658 and 660 form a cluster controlled by a controller 676. Controllers 672 and 674 are coupled to an intermediate level controller 680 which in turn is coupled to a top-level controller 690 that interfaces with a memory (not shown). The controller 676 is also coupled to the top-level controller 690. Many other hierarchical arrangements are possible, including using different numbers of processors per cluster, different numbers of clusters, and a different (or no) division of controllers.

In the system of FIG. 6, causality monitoring and buffering may be performed at various levels of the hierarchy. For example, buffering (BUF) and causality monitoring (CM) logic may be included in each of the controllers 672, 674, 676, 680 and 690. Stores may then be passed to higher levels in the hierarchy tagged with any known ordering restrictions imposed by the causality monitoring logic. As a result, different processors in the system may observe stores in different orders. For example, the top-level controller 690 may be able to perform more optimizations than low level controllers such as controller 672 because the top-level controller 690 has more or at least different stores to rearrange, combine, or otherwise manipulate.

As discussed with respect to other embodiments, system throughput may be improved by more efficiently ordering memory accesses. Such optimizations may include or relate to write combining, paging, interleaving, load bypassing, or other known or available memory access optimization techniques. Embodiments disclosed may allow a processor consistency memory ordering model to be maintained, advantageously providing backwards compatibility with existing code that assumes compatibility with a processor consistency memory ordering model.

Thus, causality-based memory ordering in a multiprocessing environment is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:
   a plurality of processors;
   arbitration logic coupled to said plurality of processors, said arbitration logic and said plurality of processors to maintain processor consistency yet to allow a plurality of stores generated in a first order of stores by any two or more of said plurality of processors to be observed, consistent with a different order of stores that is inconsistent with the first order of stores, by at least one other of said plurality of processors; and
   causality monitoring logic coupled to said arbitration logic, the causality monitoring logic to monitor causal relationships with respect to observed stores.

2. The apparatus of claim 1 wherein said arbitration logic and said plurality of processors are to allow the plurality of stores to be observed, consistent with the different order of stores provided that causality between stores of the plurality of stores is maintained by the different order of stores allowed.

3. The apparatus of claim 1 wherein said arbitration logic is also to reorder the plurality of stores generated in the first order of stores to be observed, consistent with the different order of stores provided that causality is maintained with respect to observed stores.

4. The apparatus of claim 2 wherein the arbitration logic is to maintain causality by allowing a first sub-plurality of stores from said plurality of stores from a first sub-plurality of said plurality of processors to be observed, with respect to a second sub-plurality of other stores from a second sub-plurality of processors, consistent with the different order of stores if none of said second sub-plurality of processors have observed any of said first sub-plurality of stores.

5. The apparatus of claim 1 wherein said arbitration logic is also to ensure that stores from any one of said plurality of processors are observed in order by all of said plurality of processors.

6. The apparatus of claim 5 wherein the arbitration logic is to maintain causality by reordering a first store from a first processor to be observed, consistent with the different order of stores, with respect to a second store from a second processor only if said second processor has not observed said first store.

7. The apparatus of claim 1 wherein said arbitration logic is to ensure that loads from each processor appear to execute in order.

8. The apparatus of claim 1 wherein said arbitration logic is to ensure that loads and stores to the same address are globally ordered.

9. The apparatus of claim 1 wherein said arbitration logic is to guarantee causal relationships with respect to observed stores.

10. The apparatus of claim 5 wherein said arbitration logic is to ensure that loads from each processor appear to execute in order, to ensure that loads and stores to the same address are globally ordered, and to guarantee causal relationships with respect to observed stores.

11. The apparatus of claim 5 wherein the arbitration logic is to reorder the plurality of stores from the two or more of said plurality of processors to be observed consistent with multiple different orders of stores by different ones of said plurality of processors.

12. The apparatus of claim 5 wherein the plurality of processors are arranged in a plurality of clusters.

13. The apparatus of claim 5 wherein the arbitration logic is switch-based arbitration logic individually coupled to each of said plurality of processors and to at least one memory or another switch-based arbitration logic.

14. The apparatus of claim 1 wherein said apparatus is integrated into a single multiprocessing integrated circuit.

15. The apparatus of claim 1 further comprising store forwarding logic.

16. The apparatus of claim 15 wherein said store forwarding logic is to forward data from a first store to a first memory location from a first one of said plurality of processors to a load of the first memory location from a second one of said plurality of processors if no causal relationship exists with respect to the first store.

17. The apparatus of claim 16 wherein said store forwarding logic is to forward data from the first store from the first one of said plurality of processors to the load from the second one of said plurality of processors if a causal relationship exists with respect to the first store only if the first store is ordered before a next older store after the load which accesses the first memory location.

18. A system comprising:
a plurality of processors;
arbitration logic coupled to said plurality of processors, said arbitration logic and said plurality of processors to maintain processor consistency yet to allow a plurality of stores generated by any two or more of said plurality of processors to be observed by others of said plurality of processors, the observation by two or more of said others indicating different orderings of the plurality of stores; and
causality monitoring logic coupled to said arbitration logic, the causality monitoring logic to monitor causal relationships with respect to observed stores.

19. The system of claim 18 wherein said arbitration logic and said plurality of processors are to allow the plurality of stores to be observed indicating different orderings of the plurality of stores, provided that causality is maintained by the different orderings of the plurality of stores allowed.

20. The system of claim 18 wherein said arbitration logic is also to reorder the plurality of stores to be observed, consistent with inconsistent different orders of stores, provided that causality is maintained with respect to observed stores.

21. A multiprocessing system comprising:
a plurality of processors capable of generating a plurality of stores observable consistent with a first ordering of stores by at least one of said plurality of processors;
a memory accessible to the plurality of processors through stores to said memory, said stores observable by the plurality of processors through loads from said memory;
arbitration logic coupled to said plurality of processors, said arbitration logic including causality monitoring logic to identify a potential for causality between a sub-plurality of the plurality of stores and said arbitration logic to permit the sub-plurality of the plurality of stores to be observed by at least one other of said plurality of processors consistent with a second ordering of stores different from the first ordering of stores, said system to maintain a memory ordering consistency sufficient to ensure that causality is maintained with respect to observed stores.

22. The system of claim 21 wherein said system is to allow a plurality of stores by any two or more of said plurality of processors to be observed, consistent with inconsistent different orders of stores, by others of said plurality of processors provided that causality is maintained by the different orders of stores allowed.

23. The system of claim 21 wherein said system is to allow a plurality of stores generated in a first order of stores by any two or more of said plurality of processors to be observed, consistent with a different order of stores that is inconsistent with the first order of stores, by at least one other of said plurality of processors provided that causality is maintained with respect to observed stores.

24. The system of claim 23 wherein said arbitration logic is to reorder said plurality of stores generated in the first order of stores to be observed, consistent with the different order of stores.

25. The system of claim 21 wherein said arbitration logic is also to ensure that stores from any one of said plurality of processors are observed in order by all of said plurality of processors.

26. The system of claim 21 wherein said arbitration logic is to ensure that loads from each processor appear to execute in order.

27. The system of claim 21 wherein said arbitration logic is to ensure that loads and stores to the same address are globally ordered.

28. The system of claim 25 wherein said arbitration logic is to ensure that loads from each processor appear to execute in order, to ensure that loads and stores to the same address are globally ordered, and to guarantee causal relationships.

29. A system comprising:
a plurality of processors;
arbitration logic coupled to said plurality of processors, said arbitration logic comprising:
store buffering logic to buffer stores received from at least one processor of the plurality of processors; and
causality monitoring logic coupled to said store buffering logic, the causality monitoring logic to monitor causal relationships with respect to buffered stores.

30. The system of claim 29 wherein said arbitration logic further comprises store forwarding logic.

31. The system of claim 30 wherein said store forwarding logic is to forward data from a first store to a first memory location from a first one of said plurality of processors to a load of the first memory location from a second one of said plurality of processors if no causal relationship exists with respect to the first store and the second one of said plurality of processors.

32. The system of claim 31 wherein said store forwarding logic is to forward data from the first store from the first one of said plurality of processors to the load from the second one of said plurality of processors if a causal relationship exists only if the first store is ordered before a next older store after the load which accesses the first memory location.

33. The system of claim 29 wherein said arbitration logic further comprises access optimization logic to alter load and store access ordering of loads and stores received from said plurality of processors.

34. The system of claim 29 wherein said arbitration logic further comprises access optimization logic to ensure that stores from any one of said plurality of processors are observed in order by all of said plurality of processors, and to allow a plurality of stores generated in a first order of stores by any two or more of said plurality of processors to be observed, consistent with a different order of stores that is inconsistent with the first order of stores, by at least one of said plurality of processors provided that causality is not violated.

35. Arbitration logic comprising:
buffering logic;
access optimization logic;
causality monitoring logic to monitor causal relationships with respect to observed stores; and
arbitration logic to cooperate with the causality monitoring logic, said buffering logic and said access optimization logic to allow a plurality of stores generated in a first order of stores by any two or more of a plurality of processors to be observed by at least one of said plurality of processors, the observation by said at least one of the plurality of processors indicating an order of stores different from the first order of stores.

36. The arbitration logic of claim 35 wherein said arbitration logic is to ensure that stores from any one of said two or more of the plurality of processors are observed, consistent with the first order of stores by all of said two or more of the plurality of processors.

37. The arbitration logic of claim 35 wherein said arbitration logic is to ensure that loads from each processor appear to execute in order.

38. The arbitration logic of claim 35 wherein said arbitration logic is to ensure that loads and stores to the same address are globally ordered.

39. The arbitration logic of claim 36 wherein said arbitration logic is to ensure that loads from each processor appear to execute in order, to ensure that loads and stores to the same address are globally ordered, and to guarantee causal relationships with respect to observed stores.

40. A method comprising:
receiving a plurality of stores generated in a first order of stores from a plurality of bus agents;
transparently monitoring causal relationships for said plurality of bus agents with respect to said plurality of stores;
allowing the plurality of stores to be observed by at least one other of said plurality of bus agents, said observation contradicting the first order of stores; and
maintaining a processor consistency memory ordering model.

41. The method of claim 40 further comprising:
ensuring that stores from any one of the plurality of bus agents are observed, consistent with the first order of said stores by all of said plurality of bus agents.

42. The method of claim 41 wherein allowing comprises:
determining if causality with respect to observed stores would be violated by allowing the plurality of stores to be observed contradictory with the first order of stores;

preventing a reordering of any one of the plurality of stores if the reordering would violate causality with respect to observed stores; and
reordering a subset of the plurality of stores that does not violate causality with respect to observed stores to be observed contradictory with the first order of stores by at least one of said plurality of bus agents.

43. The method of claim 42 wherein determining if causality is violated comprises determining whether a store depends on a prior non-globally-observed store.

44. The method of claim 40 wherein a store is observed when a processor has loaded a memory location indicated by the store.

45. The method of claim 40 wherein a store is observed when a processor loads and actually uses a memory location indicated by the store.

46. The method of claim 42 wherein preventing comprises preventing a second store from being globally observed prior to a first store if said first store is executed by a first processor prior to the second store being executed by a second processor and if the second processor loaded a memory location indicated by the first store prior to executing the second store.

47. The method of claim 40 wherein allowing comprises reordering store transactions in order to more efficiently access memory.

48. The method of claim 42 wherein preventing comprises setting one or more ordering bits in a store buffer to indicate an ordering restriction.

49. A system comprising:
a plurality of processors;
causality monitoring logic to monitor causal relationships with respect to stores observed by one or more of said plurality of processors; and
arbitration logic coupled to said plurality of processors, said arbitration logic comprising store forwarding logic to forward data from a first store to a first memory location from a first one of said plurality of processors to a load of the first memory location from a second one of said plurality of processors if no causal relationship exists with respect to the first store and the second one of said plurality of processors.

50. The system of claim 49 wherein said store forwarding logic is to forward data from the first store from the first one of said plurality of processors to the load from the second one of said plurality of processors if a causal relationship exists only if the first store is ordered before a next older store which accesses the first memory location after the load.

51. The system of claim 50 wherein the store forwarding logic is also to signal a causal relationship being established when data is forwarded from the first store to the first memory location from the first one of said plurality of processors to the load of the first memory location from the second one of said plurality of processors when no prior causal relationship exists.

52. The system of claim 49 wherein said arbitration logic is to allow a plurality of stores generated in a first order of stores by any two or more of said plurality of processors to be observed, consistent with a different order of stores that is inconsistent with the first order of stores, by at least one of said plurality of processors provided that causality is maintained.

53. The system of claim 52 wherein the arbitration logic comprises access optimization logic to reorder the plurality of stores generated in the first order of stores to be observed, consistent with the different order of stores.

54. An apparatus comprising:

a plurality of buffers;

causality monitoring logic coupled to said plurality of buffers, the causality monitoring logic to monitor causal relationships with respect to buffered stores;

store forwarding logic to forward data from a first store to a first memory location from a first one of a plurality of processors to a load of the first memory location from a second one of said plurality of processors if no causal relationship exists with respect to the first store and the second one of said plurality of processors.

55. The apparatus of claim 54 wherein said store forwarding logic is to forward data from the first store from the first one of said plurality of processors to the load from the second one of said plurality of processors if a causal relationship exists only if the first store is ordered before a next older store which accesses the first memory location after the load.

56. The apparatus of claim 55 wherein the store forwarding logic is also to forward data from a second store from the first one of said plurality of processors to a second load which is also from said plurality of processors.

57. The apparatus of claim 56 wherein the store forwarding logic is also to signal a causal relationship being established when data is forwarded from the first store to the first memory location from the first one of said plurality of processors to the load of the first memory location from the second one of said plurality of processors when no prior causal relationship exists.

58. A method comprising:

buffering a first store to a first memory location from a first agent;

transparently monitoring loads with respect to said first store;

determining whether a causal relationship exists with respect to the first store and a first load from a second agent; and forwarding data from said first store to satisfy the first load if no causal relationship exists.

59. The method of claim 58 further comprising:

forwarding data from said first store to satisfy the first load if the causal relationship exists only if the first store is ordered before a next older store which accesses the first memory location after the load.

60. The method of claim 58 further comprising:

forwarding data from a second store from the first one of a plurality of processors to a second load which is also from said plurality of processors.

61. The method of claim 59 further comprising:

establishing a causal relationship when data is forwarded from the first store to the first memory location from the first one of said plurality of processor to the load of the first memory location from the second one of said plurality of processors when no prior causal relationship exists.

62. An apparatus comprising:

a plurality of processors;

arbitration logic coupled to said plurality of processors, said arbitration logic to reorder a plurality of stores from two or more of said plurality of processors to be observed by different ones of said plurality of processors, said observations by different ones of said plurality of processors being permitted to contradict in accordance with said reordering; and causality monitoring logic coupled to said arbitration logic, the causality monitoring logic to monitor causal relationships with respect to observed stores.

63. The apparatus of claim 62 further comprising store forwarding logic.

64. The apparatus of claim 63 wherein a first store of the plurality of stores is observed by a forwarding of data from the first store to a load from a second one of said plurality of processors.

65. The apparatus of claim 64 wherein said arbitration logic is also to ensure that stores from any one of said plurality of processors are observed, consistent with a first order of said stores by all of said plurality of processors.

66. The apparatus of claim 63, the store forwarding logic to forward data from a first store to a first memory location from a first one of said plurality of processors to a load of the first memory location from a second one of said plurality of processors if no causal relationship exists with respect to the first store and the second one of said plurality of processors.

67. The apparatus of claim 66 wherein said arbitration logic is to ensure that loads and stores to the same address are globally ordered.

68. An apparatus comprising:

a memory accessible to at least a first portion of a plurality of bus agents through stores to said memory, said stores observable by at least a second portion of the plurality of bus agents through loads from said memory;

a first bus agent of the plurality of bus agents to generate a first store to update a first initial data value at a first address of the memory;

a second bus agent of the plurality of bus agents to generate a second store to update a second initial data value at a second address of the memory;

a third bus agent of the plurality of bus agents to observe a first order for the first and second stores to the memory;

a fourth bus agent of the plurality of bus agents to observe a second order for the first and second stores to the memory;

causality checking logic to identify a potential for causality between the first and second stores to memory when the first bus agent observes the second store to memory prior to generating the first store to memory or when the second bus agent observes the first store to memory prior to generating the second store to memory; and arbitration logic coupled with the plurality of bus agents and with the causality checking logic to ensure a memory ordering wherein the first order observed by the third bus agent is the same as the second order observed by the fourth bus agent whenever the potential for causality between the first and second stores to memory is identified, but to allow for at least one memory ordering wherein the first order observed by the third bus agent is different than the second order observed by the fourth bus agent when the potential for causality between the first and second stores to memory is not identified;

a difference between the first order and the second order being indicated by an updated data value from the first store being returned to the third bus agent in response to loading data from the first address prior to the second initial data value being returned to the third bus agent in response to loading data from the second address, and an updated data value from the second store being returned to the fourth bus agent in response to loading data from the second address prior to the first initial data value being returned to the fourth bus agent in response to loading data from the first address.

69. The apparatus of claim 68 further comprising store forwarding logic coupled with the arbitration logic to forward data from the first store in response to a load from the first address by the third bus agent of the plurality of bus agents if no potential for causality between the first and second stores was identified through the first bus agent observing the second store to memory.

70. The apparatus of claim 69 wherein the store forwarding logic is coupled with the arbitration logic to forward data from the second store in response to a load from the second address by the fourth bus agent of the plurality of bus agents if no potential for causality between the first and second stores was identified through the second bus agent observing the first store to memory.

* * * * *